US009906026B2

(12) United States Patent
Lovisotto et al.

(10) Patent No.: US 9,906,026 B2
(45) Date of Patent: Feb. 27, 2018

(54) DEVICE FOR REDUCING STANDBY-MODE ENERGY CONSUMPTION OF AN ELECTRIC HOUSEHOLD APPLIANCE

(75) Inventors: Giuliano Lovisotto, Roveredo in Piano (IT); Hubert Dorigo, Sarmede (IT); Fernando De Luca, Sacile (IT)

(73) Assignee: Electrolux Home Products Corporation N.V., Brussels (BE)

( * ) Notice: Subject to any disclaimer, the term of this patent is extended or adjusted under 35 U.S.C. 154(b) by 999 days.

(21) Appl. No.: 13/637,816

(22) PCT Filed: Mar. 29, 2011

(86) PCT No.: PCT/EP2011/054803
§ 371 (c)(1),
(2), (4) Date: Apr. 26, 2013

(87) PCT Pub. No.: WO2011/120956
PCT Pub. Date: Oct. 6, 2011

(65) Prior Publication Data
US 2013/0200729 A1 Aug. 8, 2013

(30) Foreign Application Priority Data

Mar. 30, 2010 (EP) ..................... 10158329

(51) Int. Cl.
*H02J 3/00* (2006.01)
*H02J 9/00* (2006.01)
(Continued)

(52) U.S. Cl.
CPC ............... *H02J 3/00* (2013.01); *G06F 1/263* (2013.01); *G06F 1/3203* (2013.01);
(Continued)

(58) Field of Classification Search
CPC ... H01F 38/14; H02J 7/025; H02J 2007/0096; H02J 2007/0098; H02J 3/00; H02J 9/005;
(Continued)

(56) References Cited

U.S. PATENT DOCUMENTS

| 3,603,732 A | 9/1971 | George |
| 3,641,393 A | 2/1972 | Florance et al. |

(Continued)

FOREIGN PATENT DOCUMENTS

| CA | 2523166 A1 | 4/2007 |
| DE | 10 2006 054539 | 2/2008 |

(Continued)

OTHER PUBLICATIONS

Kevin M. O'Hornett; PROSPEX, Electrical System Bonding and Grounding, copyright 2006, PROSPEX sm, pp. 1 and 2.*
(Continued)

*Primary Examiner* — Jared Fureman
*Assistant Examiner* — Michael Warmflash
(74) *Attorney, Agent, or Firm* — Banner & Witcoff, Ltd.

(57) ABSTRACT

An electric household appliance (1) has an electronic control unit (5) powered by a low-voltage power unit (6), and a device (7) for reducing energy consumption of the electric household appliance in standby mode. The device includes: a bistable relay (21) which is switched by a low-voltage enabling signal (S2) to a closed position to turn on the low-voltage power unit (6), or is switched by a disabling signal (S3) to an open position to turn off the low-voltage power unit (6); a low-voltage capacitive power unit (10) designed to generate the low-voltage enabling signal (S2); and a hand-operated control device (11) interposed between the low-voltage capacitive power unit (10) and the bistable relay (21) to supply the low-voltage enabling signal (S2) to the bistable relay.

23 Claims, 5 Drawing Sheets

(51) Int. Cl.
*G06F 1/26* (2006.01)
*G06F 1/32* (2006.01)

(52) U.S. Cl.
CPC ............ *G06F 1/3296* (2013.01); *H02J 9/005* (2013.01); *Y02B 60/1285* (2013.01); *Y10T 307/911* (2015.04)

(58) Field of Classification Search
CPC ...... G06F 1/263; G06F 1/3203; G06F 1/3296; Y10T 307/911; Y02B 60/1285
USPC .................................................. 307/104, 134
See application file for complete search history.

(56) References Cited

U.S. PATENT DOCUMENTS

| | | | |
|---|---|---|---|
| 3,831,065 A | 8/1974 | Martin et al. | |
| 4,015,171 A * | 3/1977 | Miller | H02H 3/087 361/114 |
| 4,665,355 A * | 5/1987 | McCollum | H02M 3/07 323/231 |
| 5,309,939 A | 5/1994 | Stickel et al. | |
| 5,387,848 A | 2/1995 | Wong | |
| 5,453,921 A | 9/1995 | Shutts | |
| 5,525,948 A * | 6/1996 | Poulsen | H01H 3/503 335/128 |
| 5,656,946 A | 8/1997 | Sim | |
| 5,926,394 A | 7/1999 | Nguyen et al. | |
| 5,949,660 A * | 9/1999 | Rehm | H02J 1/102 348/E5.127 |
| 5,961,207 A | 10/1999 | Petkovic | |
| 6,043,994 A | 3/2000 | Keller | |
| 6,414,864 B1 | 7/2002 | Hoshi | |
| 6,496,390 B2 * | 12/2002 | Yang | H02M 3/33507 363/21.07 |
| 6,509,658 B1 * | 1/2003 | Kim | H03K 17/941 250/214 AL |
| 6,636,026 B1 * | 10/2003 | Nomoto | H02J 9/005 307/126 |
| 6,684,111 B2 * | 1/2004 | Klein | G05B 19/0428 700/21 |
| 6,724,220 B1 | 4/2004 | Snyder et al. | |
| 6,995,807 B2 * | 2/2006 | Libera | H02J 9/005 348/730 |
| 7,444,530 B2 | 10/2008 | Deppe et al. | |
| 7,730,507 B2 * | 6/2010 | Sakai | H04N 5/4401 348/730 |
| 7,765,416 B2 * | 7/2010 | Zhou | H02J 9/005 713/300 |
| 7,770,039 B2 * | 8/2010 | DuBose | H02M 3/156 323/271 |
| 7,840,142 B2 * | 11/2010 | Keller | H02J 9/005 323/318 |
| 7,948,283 B2 | 5/2011 | Tseng et al. | |
| 8,278,900 B2 * | 10/2012 | Strijker | H02M 1/4225 323/284 |
| 8,416,553 B2 | 4/2013 | Zhan et al. | |
| 9,136,777 B2 * | 9/2015 | Ettes | H02M 7/217 |
| 9,492,056 B2 * | 11/2016 | Lovisotto | H02J 9/005 |
| 2002/0190797 A1 * | 12/2002 | Deppe | H02J 9/005 330/297 |
| 2003/0086024 A1 | 5/2003 | Libera | |
| 2004/0041903 A1 | 3/2004 | Drexler et al. | |
| 2005/0041360 A1 * | 2/2005 | Dettweiler | H02J 9/005 361/160 |
| 2008/0006762 A1 | 1/2008 | Fadell et al. | |
| 2009/0021969 A1 * | 1/2009 | Butler | H02M 7/2176 363/126 |
| 2009/0295226 A1 | 12/2009 | Hodges et al. | |
| 2009/0300400 A1 * | 12/2009 | DuBose | H02M 3/156 713/340 |
| 2010/0050002 A1 * | 2/2010 | Huang | G06F 1/3287 713/310 |
| 2010/0090534 A1 * | 4/2010 | Federmann | H02J 9/005 307/66 |
| 2010/0115317 A1 | 5/2010 | Aurich et al. | |
| 2010/0306558 A1 * | 12/2010 | Kang | G06F 1/26 713/300 |
| 2011/0103104 A1 * | 5/2011 | Zhan | H02M 3/33507 363/21.17 |
| 2011/0115296 A1 * | 5/2011 | Watson | H02J 9/005 307/66 |
| 2011/0116288 A1 * | 5/2011 | Sauter | A47L 15/46 363/49 |
| 2012/0001607 A1 * | 1/2012 | Wang | H02J 9/005 323/282 |
| 2012/0293153 A1 * | 11/2012 | Garb | H02J 3/00 323/311 |
| 2013/0062968 A1 * | 3/2013 | Lovisotto | H02J 9/005 307/109 |
| 2013/0128639 A1 * | 5/2013 | Ettes | H02M 7/217 363/126 |
| 2013/0200729 A1 * | 8/2013 | Lovisotto | H02J 9/005 307/134 |
| 2013/0257395 A1 | 10/2013 | Lovisotto et al. | |

FOREIGN PATENT DOCUMENTS

| | | | |
|---|---|---|---|
| DE | 10 2008 011279 | 6/2009 | |
| DE | 102008011279 A1 * | 6/2009 | .............. G06F 1/32 |
| EP | 1 231 698 | 8/2002 | |
| EP | 2 063 523 | 5/2009 | |
| EP | 2 063 523 A2 | 5/2009 | |
| JP | 2006-072257 A | 3/2006 | |
| WO | 2006072917 A2 | 7/2006 | |

OTHER PUBLICATIONS

International Search Report issued in corresponding International Application No. PCT/EP2011/054803; dated Dec. 16, 2011.
Extended European Search Report issued in corresponding European Application No. 10158329.2 dated Oct. 19, 2010.
International Search Report issued in related International Application No. PCT/EP2011/054805, dated Apr. 28, 2011.
Extended European Search Report issued in related European Application No. 10158335.9, dated Sep. 1, 2010.
International Search Report issued in related International Application No. PCT/EP2011/066452, dated Dec. 30, 2011.
Extended European Search Report issued in related European Application No. 10180676.8 dated Apr. 11, 2011.
International Search Report issued in related International Application No. PCT/EP2011/066433, dated Nov. 25, 2011.
Extended European Search Report issued in related European Application No. 10180589.3 dated Apr. 1, 2011.
Aug. 7, 2015—(US) Non Final Office Action—U.S. Appl. No. 13/876,241.
International Search Report issued in related International Application No. PCT/EP2011/066795, dated Sep. 2, 2012.
Extended European Search Report issued in related European Application No. 10180671.9, dated Apr. 11, 2011.
Oct. 21, 2014—(US) Non Final Office Action—U.S. Appl. No. 13/876,246.
Jul. 14, 2015—(US) Non Final Office Action—U.S. Appl. No. 13/876,246.
Nov. 19, 2015—(US) Final Office Action—U.S. Appl. No. 13/876,246.
Jul. 17, 2015—(US) Non Final Office Action—U.S. Appl. No. 13/637,821.
Jan. 15, 2016—(US) Final Office Action—U.S. Appl. No. 13/637,821.
Mar. 24, 2016—(US) Non Final Office Action—U.S. Appl. No. 13/876,246.
Mar. 3, 2016—(US) Final Office Action—U.S. Appl. No. 13/876,241.
Jun. 20, 2016—(US) Office Action—U.S. Appl. No. 13/637,821.
Oct. 6, 2016—(US) Office Action—U.S. Appl. No. 13/876,242.

(56) References Cited

OTHER PUBLICATIONS

Oct. 5, 2016—(US) Notice of Allowance—U.S. Appl. No. 13/876,241.
U.S. Appl. No. 13/637,821, Entitled: Household Appliance Circuit Arrangement.

* cited by examiner

DEVICE FOR REDUCING STANDBY-MODE ENERGY CONSUMPTION OF AN ELECTRIC HOUSEHOLD APPLIANCE

FIELD AND BACKGROUND OF THE INVENTION

The present invention relates to a device for reducing standby-mode energy consumption of an electric household appliance.

As is known, some last-generation electric household appliances are designed to switch to a standby or rest mode pending command to restart the operating cycle.

Though less than in operating mode, energy consumption of the electric loads and the main electronic control unit of the appliance in standby mode is still relatively high.

Accordingly, systems for reducing standby-mode energy consumption have been devised, in which the main electronic control unit selectively opens one or more switches, e.g. monostable relays, to disconnect the electric loads of the appliance from the power mains.

Systems of this sort have the drawback of having to keep the main electronic control unit powered with a low voltage, so that, albeit reduced, energy consumption fails to comply with last-generation electric household appliance energy consumption standards, which call for less than 1 watt standby energy consumption of the appliance.

To reduce energy consumption further, electric household appliances have been designed with systems which, in standby mode, set the power unit to low voltage to power the main electronic control unit in an idle state.

German Patent Application DE-102006054539B3, for example, relates to a system for generating low voltage to power a washing machine electronic control unit, wherein a low-voltage main power unit is designed to go from an active state, in which it supplies the electronic control unit with low voltage, to an idle state, in which it cuts off low-voltage supply to the electronic control unit, but still remains partly active so it can be reactivated by a control signal.

More specifically, in the above system, the low-voltage main power unit receives the control signal via a control input, and switches state alongside a change in state of the control signal.

Though effective, the above system fails to actually zero energy consumption of the low-voltage main power unit, on account of this still being partly powered in the idle state, so as to detect the change in state of the control signal and reactivate quickly.

In other words, in the above system, the main power unit has to maintain power to its own internal electronic circuits responsible for detecting the change in state of the control signal and reactivating low voltage supply to the electronic control unit.

SUMMARY OF SELECTED INVENTIVE ASPECTS

It is therefore an object of the present invention to provide a device for further reducing standby-mode energy consumption of an electric household appliance, as compared with known systems.

According to the present invention, there is provided an electric household appliance featuring a device for reducing standby-mode energy consumption, as claimed.

BRIEF DESCRIPTION OF THE DRAWINGS

A non-limiting embodiment of the present invention will be described by way of example with reference to the accompanying drawings, in which.

DETAILED DESCRIPTION OF EXAMPLE EMBODIMENTS

Figure 1:
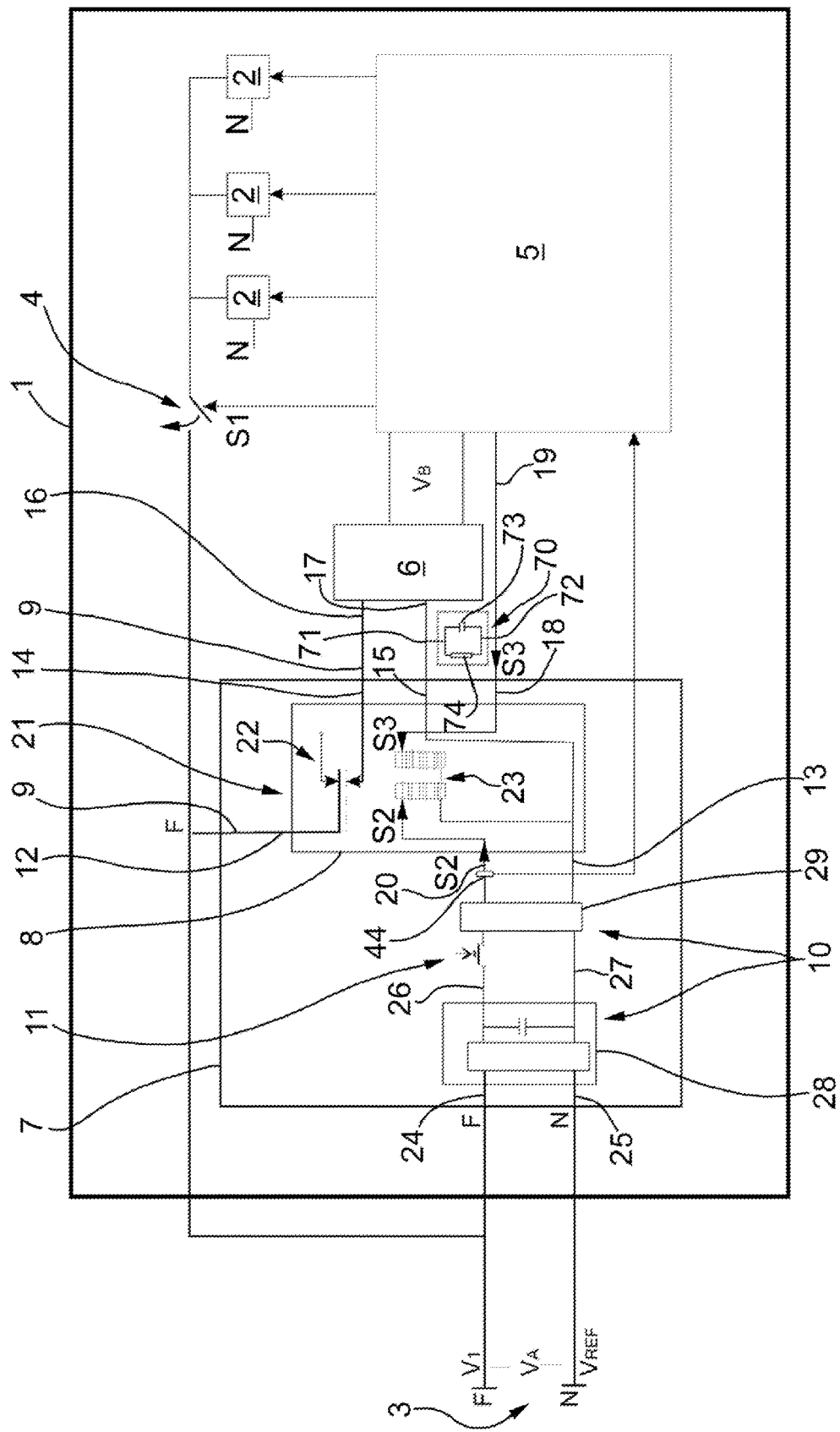
FIG. 1 shows a schematic of an electric household appliance featuring an electronic device for reducing standby-mode energy consumption and in accordance with the teachings of the present invention.
Figure 2:
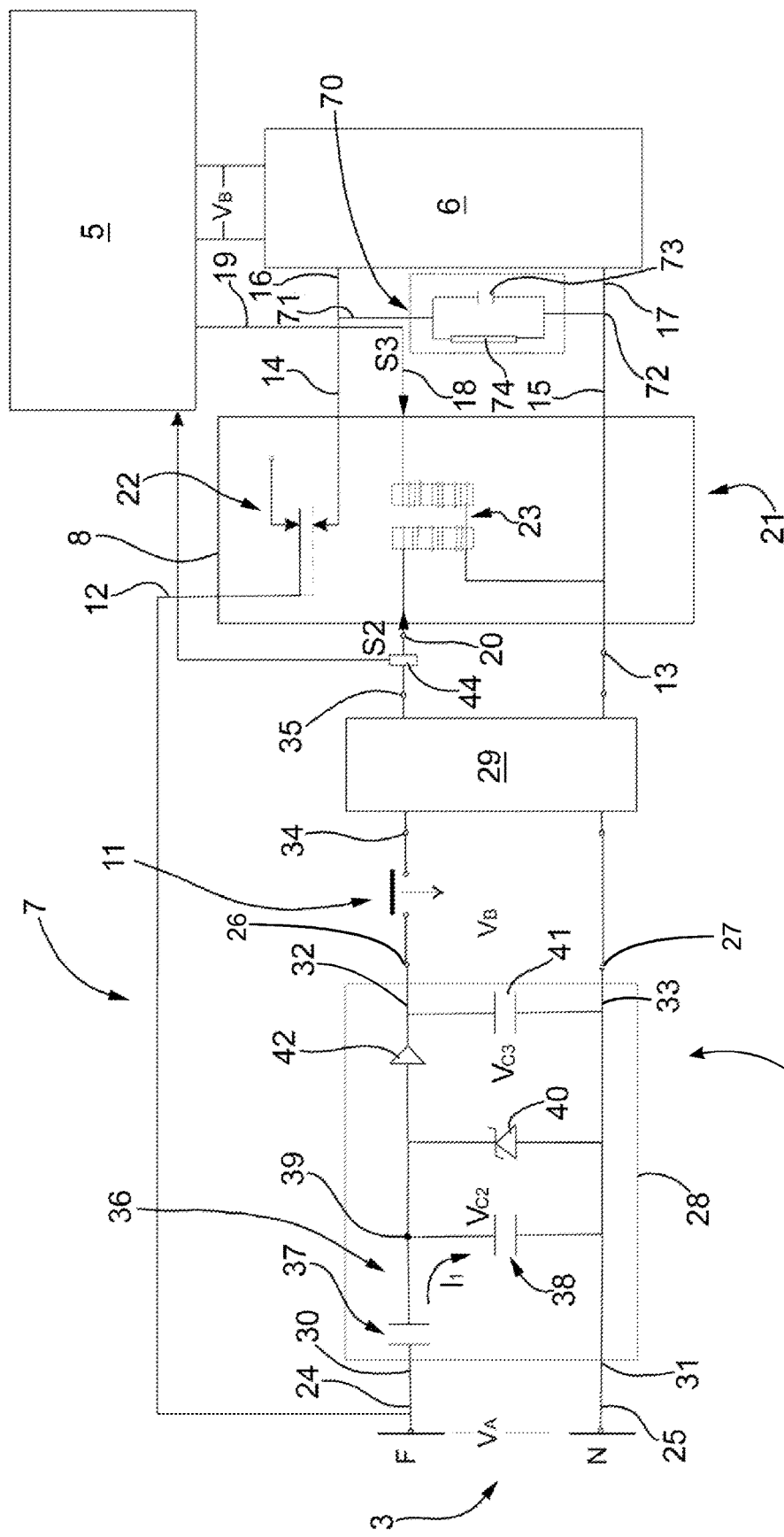
FIG. 2 shows an electric diagram of the electronic device for reducing standby-mode energy consumption of the FIG. 1 electric household appliance.
Figure 3:
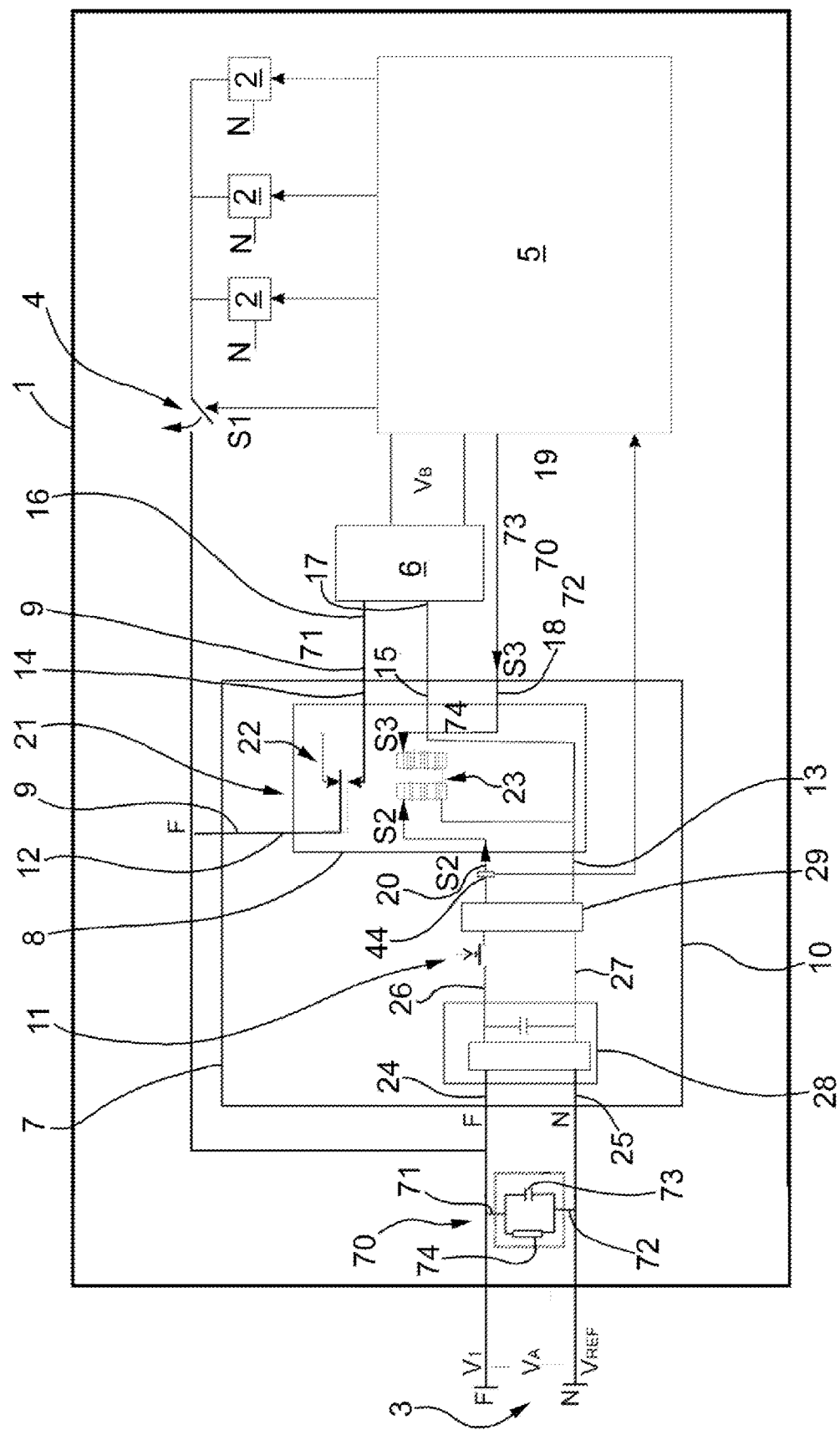
FIG. 3 shows an electric diagram of the electronic device for reducing standby-mode energy consumption of the FIG. 1 electric household appliance in accordance with a variation of the present invention.

Number 1 in FIGS. 1, 2 and 3 indicates as a whole an electric household appliance (shown schematically) connected to an electrical power network 3 comprising a neutral line N at a reference potential $V_{REF}$ corresponding to a neutral potential, and a phase line F at a phase potential V1.

In the example shown, potentials $V_{REF}$ and V1 of neutral line N and phase line F are set to obtain an alternating main supply voltage $V_A$ of roughly 220-230 V.

Appliance 1 comprises an electronic device (preferably a control unit) 5; and a low-voltage power unit 6 having an input connected to electrical power network 3 to receive main supply voltage $V_A$, and an output connected to electronic device 5 to supply it with a low supply voltage $V_B$, e.g. of about 4-12 volts.

Appliance 1 also comprises a device 7 for reducing the standby energy consumption of appliance 1, and in turn comprising switching means 8, which are located along at least one of the power lines 9 connecting low-voltage power unit 6 to phase line F and neutral line N of electrical power network 3, and operate between a closed state—in which they close power line 9 to connect low-voltage power unit 6 to electrical power network 3 and so turn on low-voltage power unit 6 and electronic device 5—and an open state—in which they open power line 9 to disconnect low-voltage power unit 6 from electrical power network 3 and so turn low-voltage power unit 6 and electronic device 5 off completely.

Preferably, switching means 8 are switched from the open to the closed state by a low-voltage enabling signal S2, or from the closed to the open state by a disabling signal S3.

Device 7 also comprises, preferably, a low-voltage capacitive power unit 10 input-connected to electrical power network 3 to receive main supply voltage $V_A$, and designed to generate low-voltage enabling signal S2 at the output.

In the FIG. 1 example, appliance 1 may be a washing machine, dishwasher, washer-dryer or drier, and comprises a number of known electric devices—hereinafter referred to simply as electric loads 2—for performing the known washing/drying functions appliance 1 is designed for.

Being known electric/electronic devices, electric loads 2 are not described, except to state that each has at least one power input connected to an electrical power network 3 by a switch 4 opened/closed by a control signal S1 to receive a main supply voltage $V_A$ from electrical power network 3.

In the FIGS. 1 and 2 example, electronic device 5 is a main electronic control unit 5 (for example a microprocessor) designed to control operation of each electric load 2 of appliance 1, and, operable to generate control signal S1 to selectively disconnect each electric load 2 from electrical power network 3 when the washing/drying cycle is concluded and/or when the appliance 1 switches to a standby mode.

Device 7 also comprises a hand-operated control device 11, e.g. a tactile switch or any other similar control device, connected between low-voltage capacitive power unit 10 and switching means 8 to supply switching means 8 with low-voltage enabling signal S2.

Switching means 8 are designed to switch from the closed to the open state on receiving disabling signal S3 generated by main electronic control unit 5 when appliance 1 switches to standby mode, and to switch from the open to the closed state on receiving low-voltage enabling signal S2 generated by user operation of control device 11.

In the FIGS. 1 and 2 example, switching means 8 comprise two input terminals 12, 13 connected respectively to phase line F and neutral line N of electrical power network 3; and two output terminals 14, 15 supplying supply voltage $V_A$ to corresponding power terminals 16, 17 of low-voltage power unit 6.

Switching means 8 also comprise a first control input 18 connected to an output 19 of main electronic control unit 5 to receive disabling signal S3; and a second control input 20 connected to the output terminal of control device 11 to receive enabling signal S2.

Preferably, switching means 8 comprise a bistable relay 21, which has an electric contact 22 movable between a first position associated with said open state and in which it opens power line 9 connecting low-voltage power unit 6 to electrical power network 3, and a second position associated with said closed state and in which it closes power line 9 to connect low-voltage power unit 6 to electrical power network 3.

Bistable relay 21 also comprises an electromagnetic device comprising, for example, two coils for moving movable electric contact 22 from the first to the second position on the basis of low-voltage enabling signal S2, or from the second to the first position on the basis of disabling signal S3.

In the FIGS. 1 and 2 example, electric contact 22 is interposed between input terminal 12 and output terminal 14, so as to open/close them on command. Electromagnetic device 23, preferably, comprises a terminal connected to second control input 20 to receive low-voltage enabling signal S2; a terminal connected to first control input 18 to receive disabling signal S3; and a terminal connected to input terminal 13.

Low-voltage capacitive power unit 10, preferably, has a terminal 24 connected to phase line F; a terminal 25 connected to neutral line N; a terminal 26 connected by control device 11 to second control input 20 of switching means 8; and a terminal 27 at a predetermined reference potential $V_{REF}$ preferably, though not necessarily, corresponding to the neutral potential.

Low-voltage capacitive power unit 10 preferably comprises a capacitive dividing circuit 28; and preferably a current-limiting circuit 29 interposed between capacitive dividing circuit 28 and switching means 8.

In the FIG. 2 circuit example, capacitive dividing circuit comprises two input terminals 30, 31 connected respectively to terminals 24, 25 to receive main supply voltage $V_A$; and two output terminals 32, 33 at a potential $V_{C3}$ and reference potential $V_{REF}$ respectively.

Current-limiting circuit 29, when envisaged, comprises, preferably, an input terminal 34 connected by control device 11 to output terminal 32 of capacitive dividing circuit 28; and an output terminal 35 connected to second control input 20 of switching means 8.

Preferably, capacitive dividing circuit 28 comprises a capacitive divider 36 connected between input terminals 30 and 31 and comprising a first capacitor 37 and a second capacitor 38 connected in series between input terminals 30 and 31 via a common node 39.

Capacitive dividing circuit 28 also preferably comprises a Zener diode 40 with the anode terminal connected to input terminal 31, and the cathode terminal connected to node 39; a third, preferably electrolytic, capacitor 41 connected between output terminals 32 and 33; and a diode 42 with the anode terminal connected to node 39, and the cathode terminal connected to output terminal 32.

In use, when capacitive dividing circuit 28 is powered by the negative half-wave of supply voltage $V_A$, Zener diode 40 conducts to only circulate a current $I_1$ through first capacitor 37, thus excluding second capacitor 38 and third capacitor 41, which is therefore not charged at this stage.

It should be pointed out that, in the FIG. 2 example, the capacity C1 of first capacitor 37 and the capacity C2 of second capacitor 38 of capacitive divider 36 are advantageously such that, during the positive half-wave of supply voltage $V_A$ to terminals 30 and 31, the voltage $V_{C2}$ at the terminals of second capacitor 38 is lower than the Zener voltage VZ of Zener diode 40, which is therefore never reverse-biased.

Preferably, when capacitive dividing circuit 28 is powered by the positive half-wave of supply voltage $V_A$, capacitive divider 36 divides supply voltage $V_A$ to generate, at the terminals of second capacitor 38, voltage $V_{C2}$, which is lower than Zener voltage VZ of Zener diode 40, so that, at this stage, Zener diode 40 remains off, and third capacitor 41 is charged with voltage $V_{C3}$.

It should be pointed out that first capacitor 37, second capacitor 38, and third capacitor 41 together define, preferably, a reactive circuit, which is supplied as a whole with a current $I_1$ having a predominantly capacitive component, which advantageously uses mainly reactive power.

Preferably, keeping Zener diode 40 off during the positive half-wave of main supply voltage $V_A$, a current $I_1$ with a highly capacitive component is circulated, so that the power dissipated by capacitive dividing circuit 28 is predominantly characterized by a reactive power component, and advantageously by a negligible active power component, thus resulting in extremely low active energy consumption of low-voltage capacitive power unit 10 as a whole.

It should be pointed out that, unlike known capacitive pump circuits, in which the Zener diode must be reverse-biased during the positive half-wave of the main supply voltage to regulate the output voltage, capacitive dividing circuit 28, preferably, serves solely to store energy by which to generate a signal and preferably and advantageously a pulse signal corresponding to low-voltage enabling signal S2 and of sufficient minimum energy to activate bistable relay 21.

In other words, capacitive dividing circuit 28 does not need to regulate the output voltage $V_{C3}$, but simply to generate a signal S2, preferably a pulse signal S2, to energize the coil of bistable relay 21. Once activated, in fact, bistable relay 21 is designed to stay permanently in the last switch position, with no need for a constant, continuous electric input signal.

The circuit architecture achieved by capacitive dividing circuit 28 supplying bistable relay 21 with an enabling pulse signal S2 therefore greatly reduces the active energy dissipated by device 7, on account of the power/energy used by device 7 being predominantly reactive.

In the example shown, capacity C1 of first capacitor 37 and C2 of second capacitor 38 may be designed to satisfy the equation:

$$V_A*(2*C1)/(C2+C1)-0.7=V_{C2} \leq VZ \qquad \text{a)}$$

where $V_A$ is the peak value of main supply voltage $V_A$; $V_{C2}$ is the voltage at the terminals of second capacitor 38; and VZ is the Zener voltage.

In the FIGS. 1 and 2 example, device 7 also comprises an EMC Filter 70 (Electro Magnetic Compatibility Filter) connected between bistable relay 21 and low-voltage power unit 6.

EMC Filter 70 has terminals 71, 72 connected respectively to power terminals 16 and 17 of the low-voltage power unit 6 and comprises a capacitor 73 and bleeder resistor 74 designed to discharge the capacitor 73.

Preferably, capacitor 73 and bleeder resistor 74 are connected in parallel to each other between terminals 71 and 72.

In accordance with a variation of the present invention shown in FIG. 3, EMC Filter 70 is interposed between electrical power network 3 and low-voltage capacitive power unit 10, i.e. upstream of the bistable relay 21. However in another alternative not shown, the EMC Filter 70 can be interposed between the low-voltage capacitive power unit 10 and the bistable relay 21.

Preferably, according to the variation shown in FIG. 3, terminals 71, 72 of the EMC Filter 70 are connected respectively to terminals 24, 25 of the Low-voltage capacitive power unit 10.

Operation of device 7 to reduce the energy consumption of appliance 1 will now be described, assuming appliance 1 is running, i.e. is not on standby mode, and bistable relay 21 is therefore in the closed position.

The appliance 1 may be operable to automatically switch to standby mode after wash/dry cycle has been completed/ended, and/or, for example, when electronic device 5 does not receive any new user-commands within a prearranged time.

Main electronic control unit 5 generates signal S1 to open switch 4 and disconnect loads 2 from electrical power network 3, preferably when wash/dry cycle has been completed/ended and at the same time or later within a prearranged time generates disabling signal S3, which preferably is in the form of a pulse-type low-voltage signal.

Disabling signal S3 switches bistable relay 21 from closed to open, thus turning off low-voltage power unit 6 and main electronic control unit 5 at the same time.

It should be pointed out that, at this stage, unlike the energy consumption reducing systems of known appliances, the total energy consumption of low-voltage power unit 6 and main electronic control unit 5 is advantageously nil.

This condition continues pending user operation/actuation of control device 11.

In practice, user operation/actuation of control device 11 supplies enabling signal S2 to bistable relay 21, which switches from open to closed to connect low-voltage power unit 6 to electrical power network 3 and so turn on main electronic control unit 5.

Main electronic control unit 5 may also be operable to advantageously enable the user to turn off the appliance 1 by means of the control device 11.

Main electronic control unit 5 is, for this purpose designed, to detect whether user operates/actuates control device 11 while the appliance is running.

Main electronic control unit 5 is, for this purpose designed, to detect whether user operates/actuates control device 11 while the appliance is running Device 7 may comprise a sensing device 44 for detecting low-voltage enabling signal S2 at second control input 20 of bistable relay 21.

Sensing device 44 may, for example, comprise a current/voltage measuring sensor for generating a logic signal indicating the presence/absence of low-voltage enabling signal S2 at second control input 20 of bistable relay 21.

Preferably, main electronic control unit 5 is designed to detect whether user operates control device 11 on the basis of the logic state of the signal generated by sensing device 44. If user operates control device 11 while the appliance is running, main electronic control unit 5 detects the logic state change of the signal generated by sensing device 44 corresponding to the presence of low-voltage enabling signal S2.

In this case, main electronic control unit 5 determines the logic state signal change and generates signal S1 to open switch 4 and disconnect loads 2 from electrical power network 3, and at the same time generates disabling signal S3, which preferably is in the form of a pulse-type low-voltage signal.

Preferably, main electronic control unit 5 may be operable to generate signals S1 and S3 when signal/s generated by sensing device 44 meet/s prearranged conditions.

In accordance with a different embodiment, prearranged conditions may be met when the signal stays in a logic state for certain time interval.

In accordance with an embodiment, a prearranged condition may be met when the logic state of the signal generated by sensing device 44 changes a prearranged number of times within a certain temporal time interval.

Main electronic control unit 5 may also be designed to advantageously detect power failure.

Preferably, main electronic control unit 5 may be operable to determine power failure of appliance 1, when low voltage $V_B$ is restored by the low-voltage main power unit in the absence of low-voltage enabling signal S2.

If power failure occurs while the appliance is running, switching means 8 remain closed, connecting low-voltage main power unit 6 to electrical power network 3; and, when power is restored, low-voltage main power unit 6 is again powered to turn on main electronic control unit 5.

In this case, main electronic control unit 5 determines whether it was turned on by power being restored, or by the user switching bistable relay 21.

In the example shown, main electronic control unit 5 determines whether the logic state of the signal generated by sensing device 44 corresponds to the presence of low-voltage enabling signal S2.

If the logic signal generated by sensing device 44 indicates no low-voltage enabling signal S2, main electronic control unit 5 determines a power failure, and so controls loads 2 according to a program for reactivating the wash/dry cycle interrupted by the power failure.

Conversely, if the logic signal generated by sensing device indicates the presence of low-voltage enabling signal S2, main electronic control unit 5 determines no power failure, and so controls loads 2 according to a specific program for reactivating the user-selected wash cycle.

However alternative embodiments can be envisaged to enable the main electronic control unit 5 to determine whether it was turned on by power being restored, or by the user switching bistable relay 21, for example the main electronic control unit can memorize at least the last step of the operating cycle running before the power failure, so that when the power is again available, the control unit 5 can recognize that an interruption has occurred and control the loads 2 accordingly for reactivating, for example, the wash/dry cycle interrupted by the power failure or the control unit 5 can proceed with specific program sequences envisaged in case of operating cycle interruption.

Electric household appliance 1 described has the following advantages:

Firstly, total standby energy consumption of the low-voltage power unit and main electronic control unit 5 is nil.

Secondly, using a bistable relay controlled by two distinct pulse signals enables use of a low-voltage capacitive power unit with simpler circuitry than conventional capacitive pumps. In fact, unlike conventional capacitive pumps, in which the Zener diode is reverse-biased to regulate the output voltage, appropriately designing the first and second capacitors of the capacitive dividing circuit, previously described, prevents reverse biasing of the Zener diode, which therefore simply acts as a voltage limiter.

Thirdly, the configuration of the capacitive dividing circuit greatly reduces active power consumption in standby mode. That is, as stated, the current circulating in the capacitive dividing circuit has a predominantly capacitive component which obviously dissipates reactive power.

Finally, using a bistable relay that permanently maintains its operating state enables power failure detection by the electronic control unit.

Clearly, changes may be made to the electric household appliance as described and illustrated herein without, however, departing from the scope of the present invention.

Figure 4:
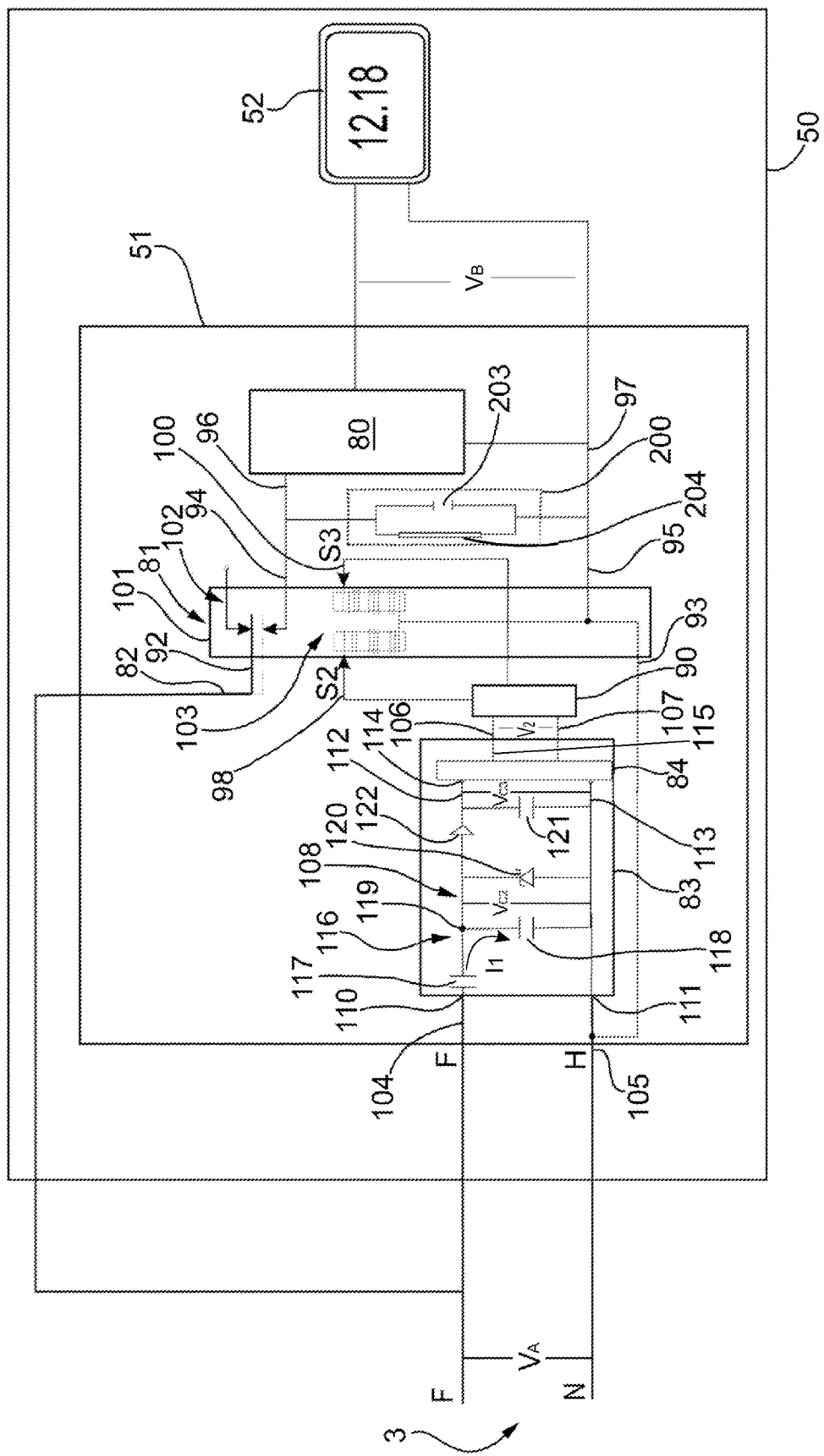
FIG. 4 shows a schematic of an oven featuring an electronic device for reducing standby-mode energy consumption of a display and in accordance with the teachings of the present invention.

For example in another alternative, depicted as an example in FIG. 4, the electric household appliance comprises display means, a voltage supply control unit for supplying an electric voltage to said display means and sensor switching means which turn on/off the low-voltage power unit according to detection of user within a given distance from the appliance, electric household appliance further comprises a device for reducing energy consumption of the electric household appliance comprising low-voltage capacitive power means designed to supply a low-voltage to said sensor switching means.

Preferably, the low-voltage capacitive power means comprises a capacitive dividing circuit comprising a first and second input terminal connected to a first and second power line at a first and second predetermined potential respectively; a first and second output terminals generating said low-voltage; first and second charge-accumulating means connected between said first and second input terminal; and at least one voltage limiter connected parallel to said second charge-accumulating means and designed to switch from a non-conducting to a conducting state when subjected to a voltage above a predetermined breakdown voltage; said first and second charge-accumulating means being so designed that the voltage at the terminals of said second charge-accumulating means is below said predetermined breakdown voltage.

Preferably, the capacitive dividing circuit comprises third charge-accumulating means connected between said first and second output terminal.

Preferably, the voltage limiter comprises a Zener diode having the anode and cathode terminals connected respectively to the input terminal of said capacitive dividing circuit and to a node between said first and second charge-accumulating means. Preferably, the first, second, and third charge-accumulating means respectively comprise a first, second, and third capacitor designed according to the equation:

$$V_A * (2*C1)/(C2+C1) - 0.7 = V_{C2} \leq VZ$$

where $V_A$ is the peak value of the main supply voltage; $V_{C2}$ is the voltage at the terminals of the second capacitor; and VZ is the Zener voltage.

Preferably, the low-voltage capacitive power means comprise voltage regulating means interposed between said capacitive dividing circuit and said sensor switching means.

More in detail, the FIG. 4 embodiment relates, for example, to an oven 50 comprising a display 52, preferably, though not necessarily a clock display; a device 51 for reducing energy consumption of display 52 when oven 50 is on standby and unattended by the user; and preferably, though not necessary, a voltage power unit 80 having an input connected to electrical power network 3 to receive main supply voltage $V_A$, and an output connected to display 52 to supply it with a secondary supply voltage $V_B$.

In FIG. 4, device 51 for reducing energy consumption of display 52 comprises switching means 81, which are located along at least one of the power lines 82 connecting voltage power unit to phase line F and neutral line N of electrical power network 3, and operate between a closed state—in which they close power line 82 to connect voltage power unit 80 to electrical power network 3 and so turn on voltage power unit 80 and display 52—and an open state—in which they open power line 82 to disconnect voltage power unit 80 from electrical power network 3 and so turn voltage power unit 80 and display 52 off completely.

Preferably, switching means 81 are switched from the open to the closed state by a low-voltage enabling signal S2, or from the closed to the open state by a disabling signal S3.

Device 51 also comprises a low-voltage capacitive power unit 83 input-connected to electrical power network 3 to receive main supply voltage $V_A$, and designed to generate a low voltage V2 at the output.

Device 51 also comprises a proximity sensor 90 for detecting the presence or absence of the user within a given distance from oven 50.

Preferably, proximity sensor 90 is connected to the output of low-voltage capacitive power unit 83, preferably, though not necessary, via a known voltage regulating device 84, and is designed to output enabling signal S2 when the user is within a given distance from oven 50, and, conversely, to output a disabling signal S3 when the user is not within a given distance from oven 50.

Switching means 81 are designed to switch from the closed to the open state on receiving disabling signal S3 when user is not within a given distance from oven 50, and to switch from the open to the closed state on receiving low-voltage enabling signal S2 when the user is within a given distance from oven 50.

In the FIG. 4, switching means 81 comprise two input terminals 92, 93 connected respectively to phase line F and neutral line N of electrical power network 3; and two output terminals 94, 95 supplying supply voltage $V_A$ to corresponding power terminals 96, 97 of voltage power unit 80.

Switching means 81 also comprise a first control input 100 connected to a first output of proximity sensor 90 to receive disabling signal S3; and a second control input 98 connected to a second output terminal of proximity sensor 90 to receive enabling signal S2.

Preferably, switching means 81 comprise a bistable relay 101, which has an electric contact 102 movable between a first position associated with said open state and in which it opens power line 82 connecting voltage power unit 80 to electrical power network 3, and a second position associated with said closed state and in which it closes power line 82 to connect voltage power unit 80 to electrical power network 3.

Bistable relay 101 also comprises an electromagnetic device 103 comprising, for example, two coils for moving movable electric contact 102 from the first to the second position on the basis of enabling signal S2, or from the second to the first position on the basis of disabling signal S3.

In the FIG. 4 example, electric contact 102 is interposed between input terminal 92 and output terminal 94, so as to open/close them on command. And electromagnetic device 103 has a terminal connected to second control input 98 to receive low-voltage enabling signal S2; a terminal connected to first control input 100 to receive disabling signal S3; and a terminal connected to input terminal 93.

Low-voltage capacitive power unit 83 has a terminal 104 connected to phase line F; a terminal 105 connected to neutral line N; a terminal 106 connected to proximity sensor device 90; and a terminal 107 at a predetermined reference potential $V_{REF}$ preferably, though not necessarily, corresponding to the neutral potential.

Low-voltage capacitive power unit 83 substantially comprises a capacitive dividing circuit 108; whereas regulating device 84, when envisaged, is interposed between capacitive dividing circuit 108 and proximity sensor 90.

In the FIG. 4 circuit example, capacitive dividing circuit 108 comprises two input terminals 110, 111 connected respectively to terminals 104, 105 to receive main supply voltage $V_A$; and two output terminals 112, 113 at a potential $V_{C3}$ and reference potential $V_{REF}$ respectively.

Regulating device 84 comprises an input terminal 114 connected to output terminal 112 of capacitive dividing circuit 108; and an output terminal 115 connected to proximity sensor 90 to supply low-voltage V2.

Preferably, capacitive dividing circuit 108 comprises a capacitive divider 116 connected between input terminals 110 and 111 and comprising a first capacitor 117 and a second capacitor 118 connected in series between input terminals 110 and 111 via a common node 119.

Capacitive dividing circuit 108 also comprises a Zener diode 120 with the anode terminal connected to input terminal 111, and the cathode terminal connected to node 119; a third, preferably electrolytic, capacitor 121 connected between output terminals 112 and 113; and a diode 122 with the anode terminal connected to node 119, and the cathode terminal connected to output terminal 112.

In the FIG. 4 embodiment, device 51 can also comprises an EMC Filter 200 (Electro Magnetic Compatibility Filter) which is interposed between bistable relay 101 and voltage power unit 80.

EMC Filter 200 has two terminals which are connected respectively to power terminals 96 and 97 of the voltage power unit 80 and comprises a capacitor 203 and a bleeder resistor 204 designed to discharge the capacitor 203.

Preferably, capacitor 203 and bleeder resistor 204 are connected in parallel to each other.

In accordance with a variation of the present invention (not shown), EMC Filter 200 is interposed between electrical power network 3 and low-voltage capacitive power unit 83, i.e. upstream the bistable relay 21.

Preferably, according to a variation, terminals of the EMC Filter 200 are connected respectively to terminals 104, 105 of the low-voltage capacitive power unit 83.

In use, when capacitive dividing circuit 108 is powered by the negative half-wave of supply voltage $V_A$, Zener diode 120 conducts to only circulate a current $I_1$ through first capacitor 117, thus excluding second capacitor 118 and third capacitor 121, which is therefore not charged at this stage.

It should be pointed out that, in the FIG. 4 example, the capacity C1 of first capacitor 117 and the capacity C2 of second capacitor 118 of capacitive divider 116 are advantageously such that, during the positive half-wave of supply voltage $V_A$ to terminals 110 and 111, the voltage $V_{C2}$ at the terminals of second capacitor 118 is lower than the Zener voltage VZ of Zener diode 120, which is therefore never reverse-biased.

Preferably, when capacitive dividing circuit 108 is powered by the positive half-wave of supply voltage $V_A$, capacitive divider 116 divides supply voltage $V_A$ to generate, at the terminals of second capacitor 118, voltage $V_{C2}$, which is lower than Zener voltage VZ of Zener diode 120, so that, at this stage, Zener diode 120 remains off, and third capacitor 121 is charged with voltage $V_{C3}$.

It should be pointed out that first capacitor 117, second capacitor 118, and third capacitor 121 together define a reactive circuit, which is supplied as a whole with a current $I_1$ having a predominantly capacitive component, which advantageously provides/uses mainly reactive power.

Preferably, keeping Zener diode 120 off during the positive half-wave of main supply voltage $V_A$, a current $I_1$ with a highly capacitive component is circulated, so the power dissipated by capacitive dividing circuit 108 is predominantly characterized by a reactive power component, and advantageously by a negligible active power component, thus resulting in extremely low active energy consumption of low-voltage capacitive power unit 83 as a whole.

It should be pointed out that, unlike known capacitive pump circuits, in which the Zener diode 120 must be reverse-biased during the positive half-wave of the main supply voltage to regulate the output voltage, capacitive dividing circuit 108 serves solely to store sufficient minimum energy by which to supply the proximity sensor 90.

The circuit architecture achieved by capacitive dividing circuit 108 supplying proximity sensor 90 therefore greatly reduces the active energy dissipated by device 51, on account of the power/energy provided/used by device 51 being predominantly reactive.

In the example shown, capacity C1 of first capacitor 117 and C2 of second capacitor 118 may be designed to satisfy the equation:

$$V_A*(2*C1)/(C2+C1)-0.7=V_{C2} \leq VZ \qquad \text{a)}$$

where $V_A$ is the peak value of main supply voltage $V_A$; $V_{C2}$ is the voltage at the terminals of second capacitor 118; and VZ is the Zener voltage.

In actual use, when the user is within a given distance from oven 50, proximity sensor 90 generates enabling signal S2 to switch movable electric contact 102 of bistable relay 101 into the second operating position and so turn on voltage power unit 80 and display 52.

Conversely, when the user is not within a given distance from oven 50, proximity sensor 90 generates disabling signal S3 to switch movable electric contact 102 into the first operating position and so turn off voltage power unit 80 and display 52.

Figure 5:
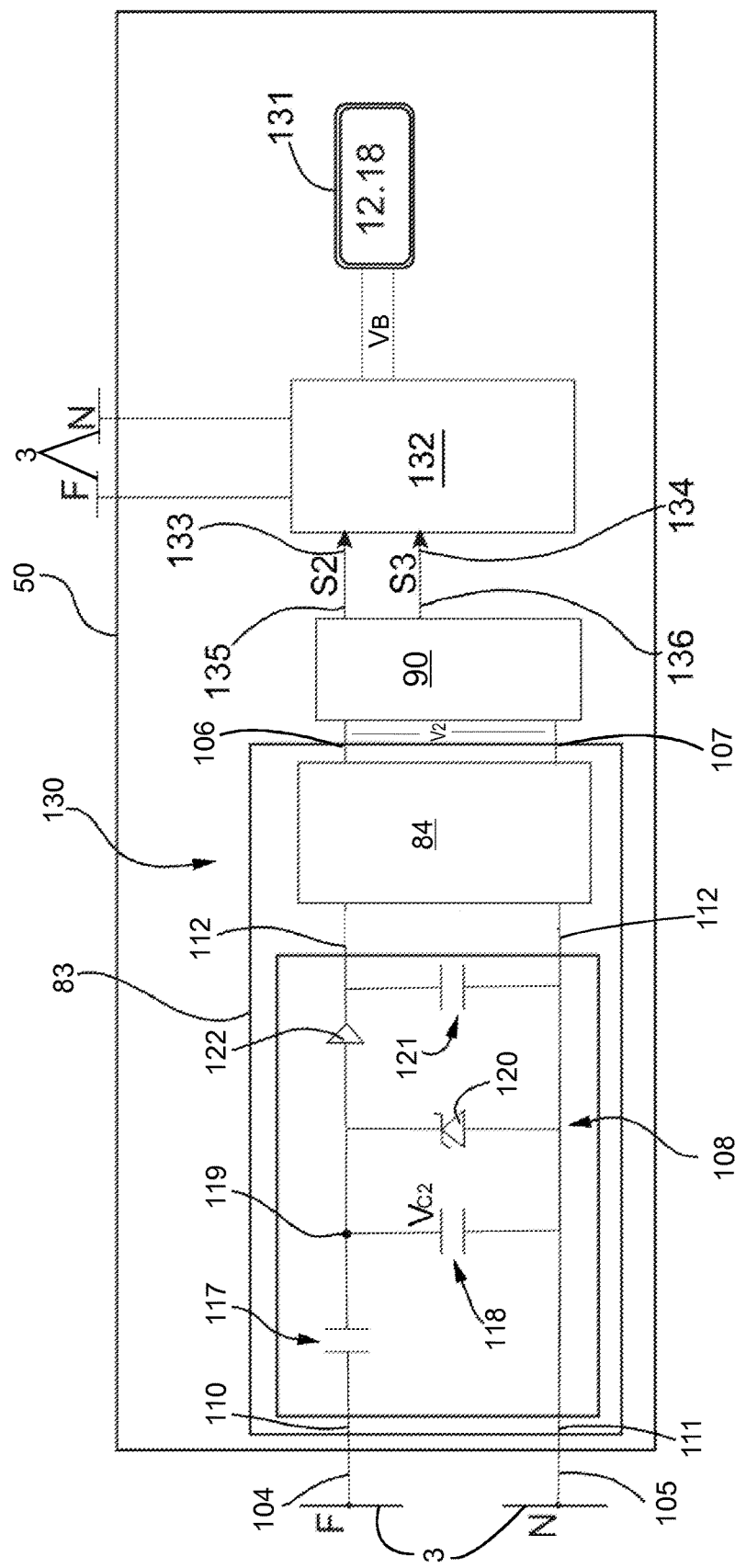
FIG. 5 shows a schematic of an oven featuring a device for powering a display with low voltage and in accordance with a variation of the present invention.

In another alternative, depicted as an example in FIG. 5, the electric household appliance comprises display means, voltage power means connected to an electrical power network to receive a main supply voltage to supply a voltage to said display means, a device for reducing energy consumption comprising:

switching means which are switched by a enabling signal to a closed state connecting said voltage power means to the electrical power network to turn on the voltage power means and said display means;

a proximity sensor generating said enabling signal when detects a user within a given distance from the appliance; and low-voltage capacitive power means which supply a low-voltage to supply said proximity sensor.

Preferably, the proximity sensor outputs a disabling signal when does not detect a user within said given distance from the appliance; said switching means being switched by the disabling signal to an open state disconnecting voltage power means from the electrical power network to turn the voltage power means and said display means off completely.

Preferably, the switching means comprise a bistable relay.

Preferably, the bistable relay comprises at least one movable electric contact movable between a first position associated with said open state and wherein it opens a power line connecting said voltage power means to a electrical power network, and a second position associated with said closed state and wherein it closes said power line.

Preferably, the bistable relay comprises electromagnetic means designed to move said movable electric contact from the first to the second position on the basis of the enabling signal, or to move the movable electric contact from the second to the first position on the basis of the disabling signal.

Preferably, the low-voltage capacitive power means comprises a capacitive dividing circuit comprising a first and second input terminal connected to a first and second power line at a first and second predetermined potential respectively; a first and second output terminals generating said low-voltage; first and second charge-accumulating means connected between said first and second input terminal; and at least one voltage limiter connected parallel to said second charge-accumulating means and designed to switch from a non-conducting to a conducting state when subjected to a voltage above a predetermined breakdown voltage; said first and second charge-accumulating means being so designed that the voltage at the terminals of said second charge-accumulating means is below said predetermined breakdown voltage.

Preferably, the capacitive dividing circuit comprises third charge-accumulating means connected between said first and second output terminal.

Preferably, the voltage limiter comprises a Zener diode having the anode and cathode terminals connected respectively to the input terminal of said capacitive dividing circuit and to a node between said first and second charge-accumulating means.

Preferably, the first, second, and third charge-accumulating means respectively comprise a first, second, and third capacitor designed according to the equation:

$$V_A * (2*C1)/(C2+C1) - 0.7 = V_{C2} \leq VZ$$

where $V_A$ is the peak value of the main supply voltage; $V_{C2}$ is the voltage at the terminals of the second capacitor; and VZ is the Zener voltage.

Preferably, the low-voltage capacitive power means comprise voltage regulating means interposed between said capacitive dividing circuit and said sensor switching means.

Preferably, the electric household appliance comprises an EMC Filter which is interposed between outputs of said switching means and input of said voltage power means.

Preferably, the electric household appliance comprises an EMC Filter being connected to the first and second input terminal of said capacitive dividing circuit.

More in detail, FIG. 5 shows an alternative device 130 for reducing energy consumption of a display 131 of an oven 50, for example, and which is similar to device 51, and the component parts of which are indicated, where possible, using the same reference numbers as for the corresponding parts of device 51.

Device 130 differs from device 51 by display 131 being connected by a power control unit 132 to the electrical power network 3 to receive supply voltage.

Moreover, device 130 has not switching means.

In detail, power control unit 132 comprises control inputs 133 and 134 connected respectively to outputs 135 and 136 of the proximity sensor 90 to receive enabling signal S2 and disabling signal S3, and is operable to be switched from a no-power supply state to a power supply state by the enabling signal S2, or from the power supply state to the no-power supply state by the disabling signal S3.

More specifically, on receiving disabling signal S3 power control unit 132 cuts off electrical power supply to display 131. In other words, disabling signal S3 commands power control unit 132 so as to turning off to display 131.

On receiving enabling signal S2, power control unit 132 supply electrical power to turn on the display 131.

The invention claimed is:
1. An electric household appliance comprising:
a control unit;
a low-voltage power unit configured to receive a main supply voltage from an electrical power network and supply a low supply voltage to said control unit, wherein the electrical power network comprises a neutral line at a reference potential and a phase line at a phase potential; and
a device for reducing energy consumption of the electric household appliance in a standby mode, wherein the device comprises:
a switch which is switched by a low-voltage enabling signal from an open state to a closed state to connect the low-voltage power unit to the electrical power network to turn on the low-voltage power unit and said control unit;
a low-voltage capacitive power supply input-connected to said electrical power network and designed to generate and output said low-voltage enabling signal, wherein the low-voltage capacitive power supply has a terminal connected to the phase line and a terminal connected to the neutral line; and
a hand-operated control device having an input connected to said low-voltage capacitive power supply to receive said low-voltage enabling signal, and an output connected to supply the received low-voltage enabling signal to said switch.

2. An electric household appliance as claimed in claim 1, wherein said switch is adapted to be switched, by a disabling signal, to said open state, thereby disconnecting the low-voltage power unit from the electrical power network to turn the low-voltage power unit and said control unit off completely.

3. An electric household appliance as claimed in claim 2, wherein the control unit is adapted to generate and output said disabling signal, which is a pulse-type low-voltage signal.

4. An electric household appliance as claimed in claim 1, wherein said switch comprises a bistable relay.

5. An electric household appliance as claimed in claim 4, wherein said bistable relay comprises at least one electric contact movable between a first position, which is associated with said open state in which a power line connecting said low-voltage power unit to the electrical power network is opened, and a second position, which is associated with said closed state in which said power line is closed.

6. An electric household appliance as claimed in claim 5, wherein said bistable relay comprises an electromagnetic device designed to move said electric contact from the first position to the second position on the basis of the low-voltage enabling signal, or to move the movable electric contact from the second position to the first position on the basis of a disabling signal different from the low-voltage enabling signal.

7. An electric household appliance as claimed in claim 1, wherein the control unit is adapted to detect whether a user actuates the hand-operated control device while the appliance is running, and the control unit is adapted to generate a disabling signal in response to the actuation of the hand-operated control device.

8. An electric household appliance as claimed in claim 1, wherein a sensor is provided for detecting the low-voltage enabling signal.

9. An electric household appliance as claimed in claim 8, wherein the control unit is adapted to detect actuation of the hand-operated control device on the basis of a signal generated by the sensor.

10. An electric household appliance as claimed in claim 9, wherein the control unit is adapted to generate a disabling signal when the signal generated by the sensor meets a prearranged condition.

11. An electric household appliance as claimed in claim 1, wherein the control unit is adapted to control operation of a plurality of electric loads and to selectively disconnect each electric load from the electrical power network when a working cycle of the electric household appliance is concluded or when the electric household appliance switches to a standby mode.

12. An electric household appliance as claimed in claim 1, wherein the control unit is adapted to determine, after a power failure and when low voltage is restored by the low-voltage power unit, whether the control unit is turned on by power being restored or by a user actuating the hand-operated control device.

13. An electric household appliance as claimed in claim 1, wherein said low-voltage capacitive power supply comprises a capacitive dividing circuit comprising:
a first input terminal and a second input terminal connected to a first power line and a second power line at a first predetermined potential and a second predetermined potential respectively;
a first output terminal adapted to supply said low-voltage enabling signal;
a first charge-accumulating device and a second charge-accumulating device that are connected between said first input terminal and said second input terminal; and
at least one voltage limiter connected in parallel to said second charge-accumulating device and designed to switch from a non-conducting state to a conducting state when subjected to a voltage above a predetermined breakdown voltage,
wherein said first charge-accumulating device and said second charge-accumulating device are designed such that a voltage at terminals of said second charge-accumulating device is below said predetermined breakdown voltage.

14. An electric household appliance as claimed in claim 13, wherein said capacitive dividing circuit comprises a second output terminal and a third charge-accumulating device connected between said first output terminal and said second output terminal.

15. An electric household appliance as claimed in claim 14, wherein said voltage limiter comprises a Zener diode having an anode terminal and a cathode terminal connected respectively to said second input terminal of said capacitive dividing circuit and to a node between said first charge-accumulating device and said second charge-accumulating device.

16. An electric household appliance as claimed in claim 1, wherein said low-voltage enabling signal is a pulse signal.

17. An electric household appliance as claimed in claim 1, comprising an electro magnetic compatibility (EMC) filter which is interposed between outputs of said switch and inputs of said low-voltage power unit.

18. An electric household appliance as claimed in claim 1, wherein the switch is switched by a disabling signal received from the control unit via a line separate from a line on which the switch receives the low-voltage enabling signal.

19. An electric household appliance as claimed in claim 1, wherein the low-voltage capacitive power supply comprises an input terminal that receives the phase potential.

20. An electric household appliance as claimed in claim 1, wherein the low-voltage capacitive power supply comprises:
a first capacitor comprising:
a first terminal coupled to the phase line and having the phase potential; and
a second terminal; and
a second capacitor comprising:
a third terminal coupled to the second terminal; and
a fourth terminal coupled to the neutral line and having the reference potential.

21. An electric household appliance as claimed in claim 20, wherein the low-voltage capacitive power supply further comprises:
a first diode comprising:
a first cathode terminal coupled to the second terminal; and
a first anode terminal coupled to the neutral line and having the reference potential;
a second diode comprising:
a second cathode terminal coupled to an output terminal of the low-voltage capacitive power supply; and
a second anode terminal coupled to the second terminal; and
a third capacitor comprising:
a fifth terminal coupled to the output terminal of the low-voltage capacitive power supply; and
a sixth terminal coupled to the neutral line,
wherein the output terminal of the low-voltage capacitive power supply supplies the low-voltage enabling signal.

22. An electric household appliance as claimed in claim 1, further comprising:

a sensor that detects the low-voltage enabling signal output from the low-voltage capacitive power supply, generates a logic signal, and outputs the logic signal to the control unit, wherein the sensor is different from the switch and the hand-operated control device.

23. An electric household appliance as claimed in claim 1, wherein the low-voltage capacitive power supply comprises a capacitive divider that divides a supply voltage of the electrical power network, the capacitive divider comprising at least two capacitors.

* * * * *